US010848390B2

(12) United States Patent
Barton et al.

(10) Patent No.: US 10,848,390 B2
(45) Date of Patent: Nov. 24, 2020

(54) PRIORITIZED RULE SET IDENTIFICATION AND ON-DEMAND CONSTRAINED DEPLOYMENT IN CONSTRAINED NETWORK DEVICES

(71) Applicant: Cisco Technology, Inc., San Jose, CA (US)

(72) Inventors: Robert Edgar Barton, Richmond (CA); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 189 days.

(21) Appl. No.: 15/953,600

(22) Filed: Apr. 16, 2018

(65) Prior Publication Data

US 2019/0319855 A1 Oct. 17, 2019

(51) Int. Cl.
*H04L 12/24* (2006.01)
*H04L 12/701* (2013.01)
(Continued)

(52) U.S. Cl.
CPC ............. *H04L 41/20* (2013.01); *H04L 45/00* (2013.01); *H04L 45/22* (2013.01); *H04L 45/28* (2013.01)

(58) Field of Classification Search
CPC ........ G06F 1/26; G06F 1/3203; G06F 1/3234; G06F 1/3296; G06K 15/4055;
(Continued)

(56) References Cited

U.S. PATENT DOCUMENTS 6,973,335 B2 * 12/2005 Ganton ................. H04W 52/00 455/573
7,760,701 B2 7/2010 Levy-Abegnoli et al.
(Continued)

FOREIGN PATENT DOCUMENTS

WO 2017027246 A1 2/2017

OTHER PUBLICATIONS

Cisco, "Cisco Application Policy Infrastructure Controller Enterprise Module Configuration Guide, Release 1.2x", [online], Feb. 11, 2018, [retrieved on Mar. 19, 2018]. Retrieved from the Internet: URL: <https://www.cisco.com/c/en/us/td/docs/cloud-systems-management/application-policy-infrastructure-controller-enterprise-module/1-2-x/config-guide/b_apic-em_config_guide_v_1-2-x/b_apic-em_config_guide_v_1-2-x_chapter_010.html>, pp. 1-11.
(Continued)

*Primary Examiner* — Ninos Donabed
(74) *Attorney, Agent, or Firm* — Leon R. Turkevich

(57) ABSTRACT

In one embodiment, a method comprises a management device, in a constrained network comprising constrained network devices, identifying for each constrained network device all available rules for execution by the corresponding constrained network device; the management device generating a prioritized rule set for each constrained network device, each prioritized rule set having selected available rules ordered relative to priority of execution by the corresponding constrained network device relative to a corresponding device context and a corresponding network context of the corresponding constrained network device; and the management device executing, for each constrained network device, a corresponding constrained deployment of the corresponding prioritized rule set based on identifying, from the corresponding prioritized rule set, a lifetimed rule set relative to the corresponding device context and network
(Continued)

context, and supplying the lifetimed rule set to the corresponding constrained network device.

20 Claims, 5 Drawing Sheets

(51) Int. Cl.
*H04L 12/703* (2013.01)
*H04L 12/707* (2013.01)

(58) Field of Classification Search
CPC . H04W 52/00; H04W 52/02; H04W 12/0401; H04W 12/0609; H04W 80/04; Y02D 10/00; Y02D 10/10; Y02D 10/20; Y02D 10/40; Y04S 20/225; H04L 45/00; H04L 45/22; H04L 45/28; H04L 12/4633; H04L 43/0876; H04L 43/16; H04L 45/12; H04L 45/50; H04L 63/0823; H04L 67/12; H04L 12/2801; H04L 12/66; H04L 29/12216; H04L 45/04
USPC ............. 713/300, 320, 321; 709/201–225; 726/1–25
See application file for complete search history.

(56) References Cited

U.S. PATENT DOCUMENTS

| | | | |
|---|---|---|---|
| 9,116,736 B2 | 8/2015 | Shamsee et al. | |
| 9,690,937 B1* | 6/2017 | Duchin | G06F 21/562 |
| 9,819,699 B1 | 11/2017 | Nenov | |
| 10,382,358 B1* | 8/2019 | Jain | H04L 43/16 |
| 2003/0190938 A1* | 10/2003 | Ganton | H04W 52/00 455/574 |
| 2004/0205206 A1* | 10/2004 | Naik | H04L 29/06 709/230 |
| 2005/0056199 A1* | 3/2005 | Norrie | E02B 3/062 114/263 |
| 2007/0233877 A1* | 10/2007 | Qu | H04L 61/2517 709/227 |
| 2008/0140469 A1* | 6/2008 | Iqbal | G06Q 10/06375 705/7.37 |
| 2010/0175124 A1* | 7/2010 | Miranda | H04L 63/0263 726/13 |
| 2011/0072253 A1* | 3/2011 | Iqbal | G06Q 10/04 713/1 |
| 2013/0165238 A1* | 6/2013 | Batista Jerez | A63F 13/335 463/42 |
| 2013/0318220 A2 | 11/2013 | Ardiri et al. | |
| 2015/0072791 A1* | 3/2015 | Batista Jerez | A63F 13/30 463/42 |
| 2015/0333992 A1 | 11/2015 | Vasseur et al. | |
| 2016/0255139 A1* | 9/2016 | Rathod | H04L 51/046 709/203 |
| 2017/0124617 A1* | 5/2017 | Spoelstra | G06Q 30/0621 |
| 2017/0154017 A1* | 6/2017 | Kristiansson | G06F 16/957 |
| 2017/0235783 A1 | 8/2017 | Chen et al. | |
| 2018/0115552 A1* | 4/2018 | Kantubukta | G06F 9/5038 |

OTHER PUBLICATIONS

Compute Engine, "Scaling Based on CPU or Loading Balancing Serving Capacity", [online], Feb. 22, 2018, [retrieved on Mar. 16, 2018]. Retrieved from the Internet: URL: <https://cloud.google.com/compute/docs/autoscaler/scaling-cpu-load-balancing>, pp. 1-6.
Wikipedia, "NetFlow", [online], Mar. 16, 2018, [retrieved on Mar. 26, 2018]. Retrieved from the Internet: URL: <https://en.wikipedia.org/w/index.php?title=NetFlow&printable=yes>, pp. 1-10.
Domb et al., "Lightweight adaptive Random-Forest for IoT rule generation and execution", [online], Journal of Information Security and Applications, vol. 34, part 2, Jun. 2017, [retrieved on Feb. 20, 2018]. Retrieved from the Internet: URL: <https://www.sciencedirect.com/science/article/pii/S2214212616302332>, pp. 1-2.
Technical Documentation, "CM-Series 7.1 Deployment Guide", [online], Palo Alto Networks, Inc., [retrieved on Mar. 16, 2018]. Retrieved from the Internet: URL: <https://www.paloaltonetworks.com/documentation/71/virtualization/virtualization/set-up-the-vm-series-firewall-in-aws/how-does-the-vm-series-auto-scaling-template-for-aws-enable-dynamic-scaling#_75926>, 5 pages.
Winter, Ed., et al., "RPL: IPv6 Routing Protocol for Low-Power and Lossy Networks", Internet Engineering Task Force (IETF), Request for Comments: 6550, Mar. 2012, pp. 1-157.
Suarez et al., "ID3 and k-means based methodology for Internet of Things device classification", [online], 2017 International Conference on Mechatronics, Electronics and Automotive Engineering, [retrieved on Feb. 20, 2018]. Retrieved from the Internet: URL: <http://ieeexplore.ieee.org/document/8241329/>, pp. 129-133.
Cisco, "AVC:AVC Tech Overview", [online], Apr. 30, 2013, [retrieved on Apr. 10, 2018]. Retrieved from the Internet: URL: <http://docwiki.cisco.com/w/index.php?title=AVC:AVC_Tech_Overview&printable=yes>, pp. 1-14.

* cited by examiner

US 10,848,390 B2

1

PRIORITIZED RULE SET IDENTIFICATION AND ON-DEMAND CONSTRAINED DEPLOYMENT IN CONSTRAINED NETWORK DEVICES

TECHNICAL FIELD

The present disclosure generally relates to prioritized rule set identification and on-demand constrained deployment in constrained network devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power and Lossy Networks (LLNs), e.g., sensor networks, have a myriad of applications, such as Smart Grid and Smart Cities. The LLNs include constrained network devices and constrained links between the constrained network devices, resulting in particular challenges in the deployment of the LLNs. The constrained links can include lossy links, low bandwidth (low data rates), etc., where changing environmental conditions can adversely affect device communications via the constrained links. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, can cause high loss rates, instability, etc.

The LLNs also can utilize a large number (e.g., tens of thousands) of constrained network devices: the constrained network devices, implemented for example as "Internet of Things" (IoT) devices, are typically implemented as low-cost (e.g., as low as a few cents in production cost) devices having limited battery operation, low memory and/or reduced processing capability, etc. Such constrained network devices can be configured for extremely low-power operation that can enable battery-only operation for ten years or more.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
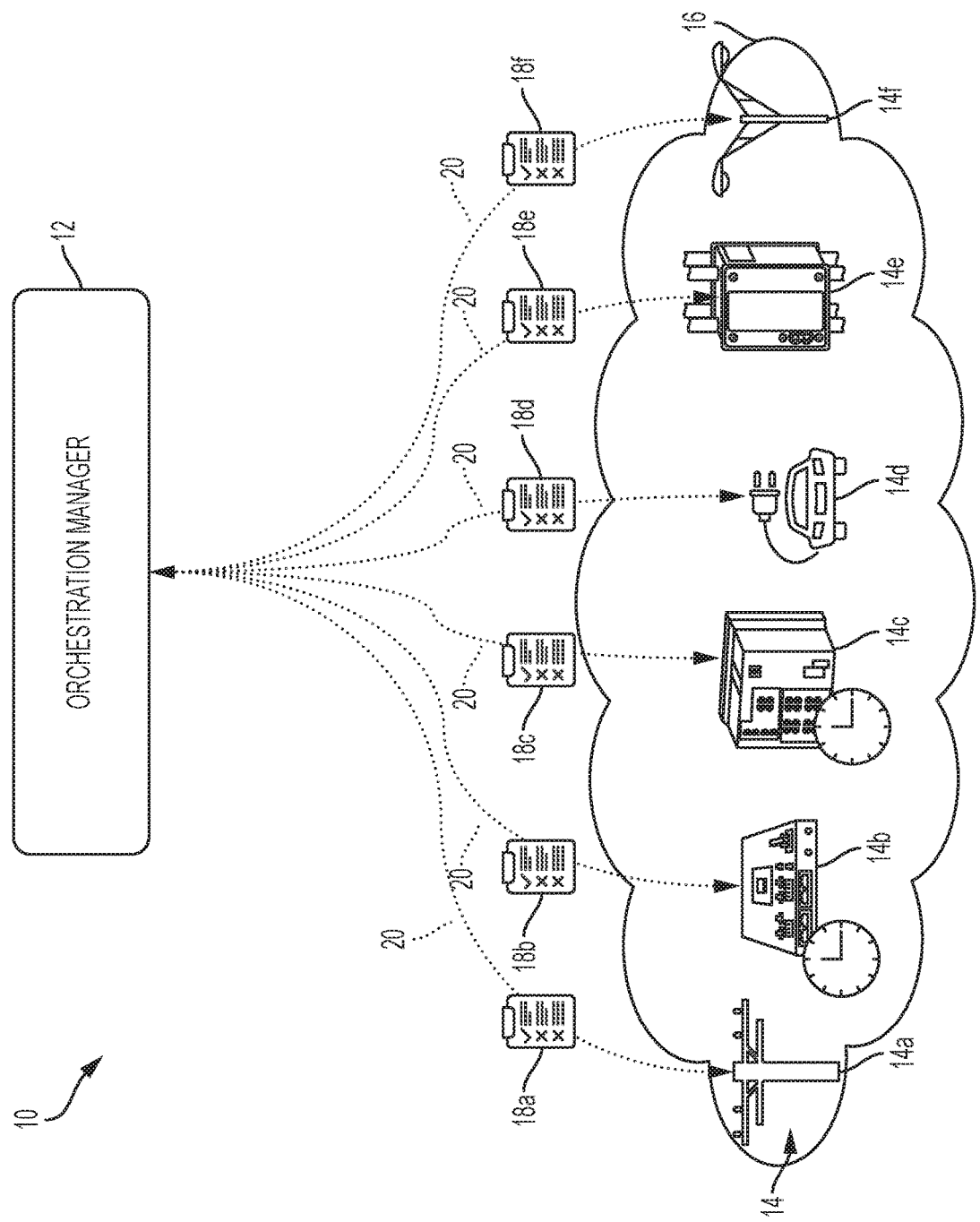
FIG. 1 illustrates an example system having an apparatus configured for generating, for each constrained network device, a prioritized rule set for on-demand constrained deployment by the corresponding constrained network device of a lifetimed rule set from the prioritized rule set, according to an example embodiment.

In one embodiment, a method comprises a management device, in a constrained network comprising constrained network devices, identifying for each constrained network device all available rules for execution by the corresponding constrained network device; the management device generating a prioritized rule set for each constrained network device, each prioritized rule set having selected available rules ordered relative to priority of execution by the corresponding constrained network device relative to a corresponding device context and a corresponding network context of the corresponding constrained network device; and the management device executing, for each constrained network device, a corresponding constrained deployment of the corresponding prioritized rule set based on identifying, from the corresponding prioritized rule set, a lifetimed rule set relative to the corresponding device context and network context, and supplying the lifetimed rule set to the corresponding constrained network device.

In another embodiment, an apparatus comprises a device interface circuit and a processor circuit. The device interface circuit is configured for communication in a constrained network comprising constrained network devices. The processor circuit is configured for identifying for each constrained network device all available rules for execution by the corresponding constrained network device. The processor circuit further is configured for generating a prioritized rule set for each constrained network device, each prioritized rule set having selected available rules ordered relative to priority of execution by the corresponding constrained network device relative to a corresponding device context and a corresponding network context of the corresponding constrained network device. The processor circuit further is configured for executing, for each constrained network device, a corresponding constrained deployment of the corresponding prioritized rule set based on identifying, from the corresponding prioritized rule set, a lifetimed rule set relative to the corresponding device context and network context, and causing the device interface circuit to output the lifetimed rule set to the corresponding constrained network device.

In another embodiment, one or more non-transitory tangible media are encoded with logic for execution by a machine and when executed by the machine operable for: the machine, implemented as a management device in a constrained network comprising constrained network devices, identifying for each constrained network device all available rules for execution by the corresponding constrained network device; the management device generating a prioritized rule set for each constrained network device, each prioritized rule set having selected available rules ordered relative to priority of execution by the corresponding constrained network device relative to a corresponding device context and a corresponding network context of the corresponding constrained network device; and the management device executing, for each constrained network device, a corresponding constrained deployment of the corresponding prioritized rule set based on identifying, from the corresponding prioritized rule set, a lifetimed rule set relative to the corresponding device context and network context, and supplying the lifetimed rule set to the corresponding constrained network device.

DETAILED DESCRIPTION

Particular embodiments provide an apparatus (e.g., a management device or "orchestrator manager" device) configured for providing an optimized deployment of rules that are to be executed by constrained network devices (e.g., IoT devices) in a constrained network. The apparatus is configured for providing the optimized deployment of rules based on generating, for each constrained network device, a prioritized rule set of available rules that can be executed by the corresponding constrained network device. The prioritized rule set includes available rules that are selected (i.e., "selected available rules") based on their relative prioritization of execution by the constrained network device, relative to the corresponding device context (e.g., device configuration, device capacity, device state, device location, device importance or relevance in providing an identified network service or identified application service, etc.), and/or relative to a corresponding network context of the constrained device (e.g., network location, Quality of Service (QoS) requirements required of the network device, potential exposure to network-based threats, exposure to or isolation from different types of network traffic, etc.).

The management device further can provide the optimized deployment of rules based on executing, for each constrained network device, a constrained deployment of the corresponding prioritized rule set: the constrained deployment is based on identifying, from the prioritized rule set, a lifetimed rule set that includes the highest-priority rules to be executed by the corresponding constrained network device (according to the device context and network context), while ensuring the highest-priority rules in the lifetimed rule set are below the processing capacity of the corresponding constrained network device.

Hence, the management device can supply the lifetimed rule set to the corresponding constrained network device for constrained deployment of the corresponding prioritized rule set. Hence, the lifetimed rule set can provide only the highest-priority rules that are needed by the corresponding constrained network device at the current instance (or for an upcoming device event or network event); each rule in the lifetimed rule set also can include a corresponding lifetime rule that indicates when the corresponding lifetime rule should be removed from execution and deleted from the constrained network device memory. The management device also can monitor and record performance impact of each rule executed by a constrained network device, and update the corresponding rule set accordingly, enabling the management device to predict an optimal set of rules that balances priorities of execution relative to the performance impacts of the available rules. Additional lifetimed rule sets can be supplied by the management device as previously-transmitted rules are purged by the constrained network device according to the respective lifetimed rules.

Hence, the example embodiments enable the management device to provide an optimized and constrained "on-demand" deployment of the most important rules needed by a constrained network device for a given event currently (or about to be) encountered by the constrained network device, while ensuring that the rules provided by the management device are below the processing capacity of the constrained network device. The management device can dynamically update the prioritized rule set and/or output updated lifetimed rule sets, within the processing capacity of the constrained network device, based on completion of prior rules by the constrained network device and/or based on upcoming events to be encountered by the constrained network device. Hence, the management device can provide scalable, on-demand deployment of prioritized rules for constrained network devices.

FIG. 1 is a diagram illustrating an example data network 10 having an apparatus (i.e., an "orchestration manager device" or "management device") 12 configured for prioritized rule set identification and on-demand constrained deployment of the prioritized rules for constrained network devices 14 in a constrained data network 16, according to an example embodiment. The constrained data network 16 (and optionally the data network 10) can be implemented as an Internet Protocol (IP) based LLN, implemented for example using the Routing Protocol for Low Power and Lossy Networks (RPL) according to the Internet Engineering Task Force (IETF) Request for Comments (RFC) 6550; the data network 10 also can be implemented as a heterogeneous network that communicates with the constrained network devices 14 in the constrained data network 16 via a local area network (LAN) and/or a Wide Area Network (WAN) (e.g., the Internet). Although not shown in FIG. 1 to minimize cluttering, the data network 10 and/or the constrained data network 16 can include additional router devices, switching devices, gateway devices, etc., for establishing communication paths 20 with the respective constrained network devices 14 via wired and/or wireless data links.

The management device 12 is configured for executing a constrained deployment of prioritized rules for each constrained network device 14 based on supplying (e.g., "pushing") to each constrained network device 14, via the corresponding communication path 20 in the constrained data network 16, a corresponding lifetimed rule set 18 that is generated for each constrained network device 14 by the management device 12 according to a corresponding device context and a corresponding network context, described below.

Each lifetimed rule set 18 includes a prioritized list of rules for execution by the corresponding constrained network device 14, where the corresponding lifetimed rule set 18 includes no more than the most important or most relevant rules that can be executed within (i.e., below) the corresponding processing capacity of the constrained network device 14: hence each lifetimed rule set 18 is limited to the most important rules and/or most relevant rules that can be executed by the corresponding constrained network device 14, without overwhelming the processing capacity of the constrained network device 14.

As illustrated in FIG. 1, the constrained data network 16 can include different types of constrained network devices 14 having different processing capabilities for different service applications or different data traffic, as well as different processing capacities depending on implementation. For example, the constrained data network 16 can include a SmartGrid gateway device 14a, an IoT router or gateway device (e.g., a commercially-available Cisco® Model 809 IoT router or Cisco IR500 Series router from Cisco Systems, San Jose, Calif.) 14b, a commercially-available Cisco® IE4000 Industrial Ethernet Layer 3 (L3) switch 14c, an IoT gateway 14d configured for Internet-based communications and deployed at an Electric Vehicle (EV) recharging station, a commercially-available Cisco® 1000 Series Connected Grid Router 14e, and/or a connected LED lighting gateway/controller 14f configured for Internet-based communications; other types of constrained network devices 14 in the constrained data network 16 that are reachable by the management device 12 via respective communication paths 20 can include wireless sensor devices or "motes" such as wireless remote cameras, wireless weather sensors, embedded roadside sensors, unmanned aerial vehicle (UAV) "drone" devices such as quadcopters, etc.

As described in further detail below, the management device 12 is configured for constrained and scalable deployment of corresponding prioritized rule sets as lifetimed rule sets for each of the constrained network devices 14 via the respective communication paths 20. Hence, each constrained network device 14 can receive a "just-in-time" deployment of the most important and/or most relevant rules needed by the corresponding constrained network device 14 for operations in the constrained data network 16, based on receiving the corresponding lifetimed rule set 18. Hence, the constrained network device 14a can receive, from the orchestration manager 12, its corresponding lifetimed rule set 18a including the most important rules for SmartGrid gateway operations; the constrained network device 14b can receive, from the orchestration manager 12, its corresponding lifetimed rule set 18b including the most important rules for IoT router operations; the constrained network device 14c can receive, from the orchestration manager 12, its corresponding lifetimed rule set 18c including the most important rules for industrial Ethernet switching (including, for example, IEEE 1588 PTP v2); the constrained network device 14d can receive, from the orchestration manager 12, its corresponding lifetimed rule set 18d including the most important rules for connected car operations (e.g. smart battery charging, traffic/weather alerts, recall notices, etc.); the constrained network device 14e can receive, from the orchestration manager 12, its corresponding lifetimed rule set 18e including the most important rules for Field Area Network (FAN) operations; and the constrained network device 14f can receive, from the orchestration manager 12, its corresponding lifetimed rule set 18f including the most important rules for connected lighting operations (e.g., power over Ethernet lighting controls, etc.).

Figure 2:
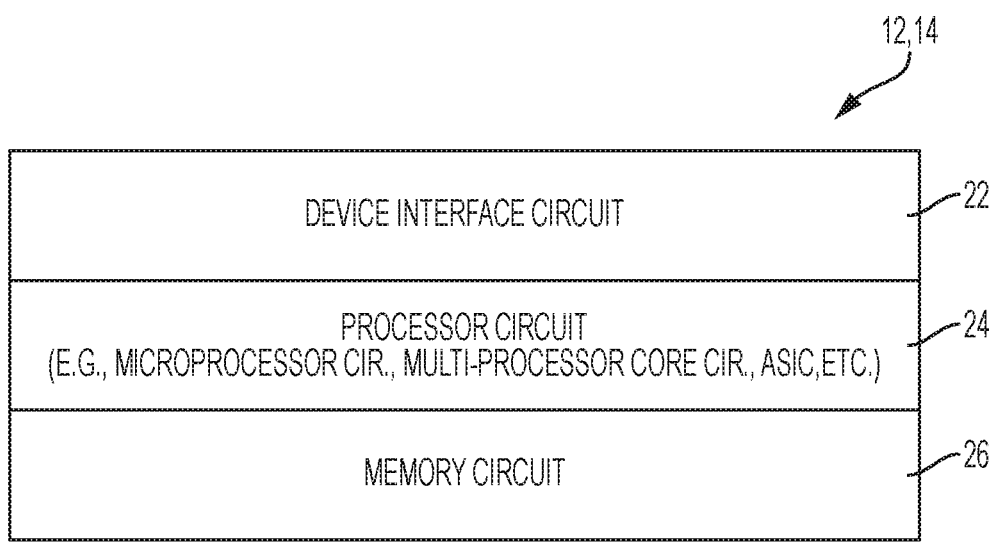
FIG. 2 illustrates an example implementation of any one of the orchestration device or constrained network devices of FIG. 1, according to an example embodiment.

FIG. 2 illustrates an example implementation of any one of the devices 12, 14 of FIG. 1, according to an example embodiment. Each apparatus 12, 14 is a physical machine (i.e., a hardware device) configured for implementing network communications with other physical machines via the network 10 and/or 14 according to existing link layer and/or network layer routing protocols such as RPL. The term "configured for" or "configured to" as used herein with respect to a specified operation refers to a device and/or machine that is physically constructed and arranged to perform the specified operation.

Each apparatus 12 and/or 14 can include a device interface circuit 22, a processor circuit 24, and a memory circuit 26. The device interface circuit 22 can include one or more distinct physical layer transceivers for communication with any one of the other devices 12 and/or 14; the device interface circuit 22 also can include an IEEE based Ethernet transceiver for communications with the devices of FIG. 1 via any type of data link (e.g., a wired or wireless link, an optical link, etc.). The processor circuit 24 can be configured for executing any of the operations described herein, and the memory circuit 26 can be configured for storing any data or data packets as described herein.

Any of the disclosed circuits of the devices 12 and/or 14 (including the device interface circuit 22, the processor circuit 24, the memory circuit 26, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 26) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 26 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 26 can be implemented dynamically by the processor circuit 24, for example based on memory address assignment and partitioning executed by the processor circuit 24.

Figure 3:
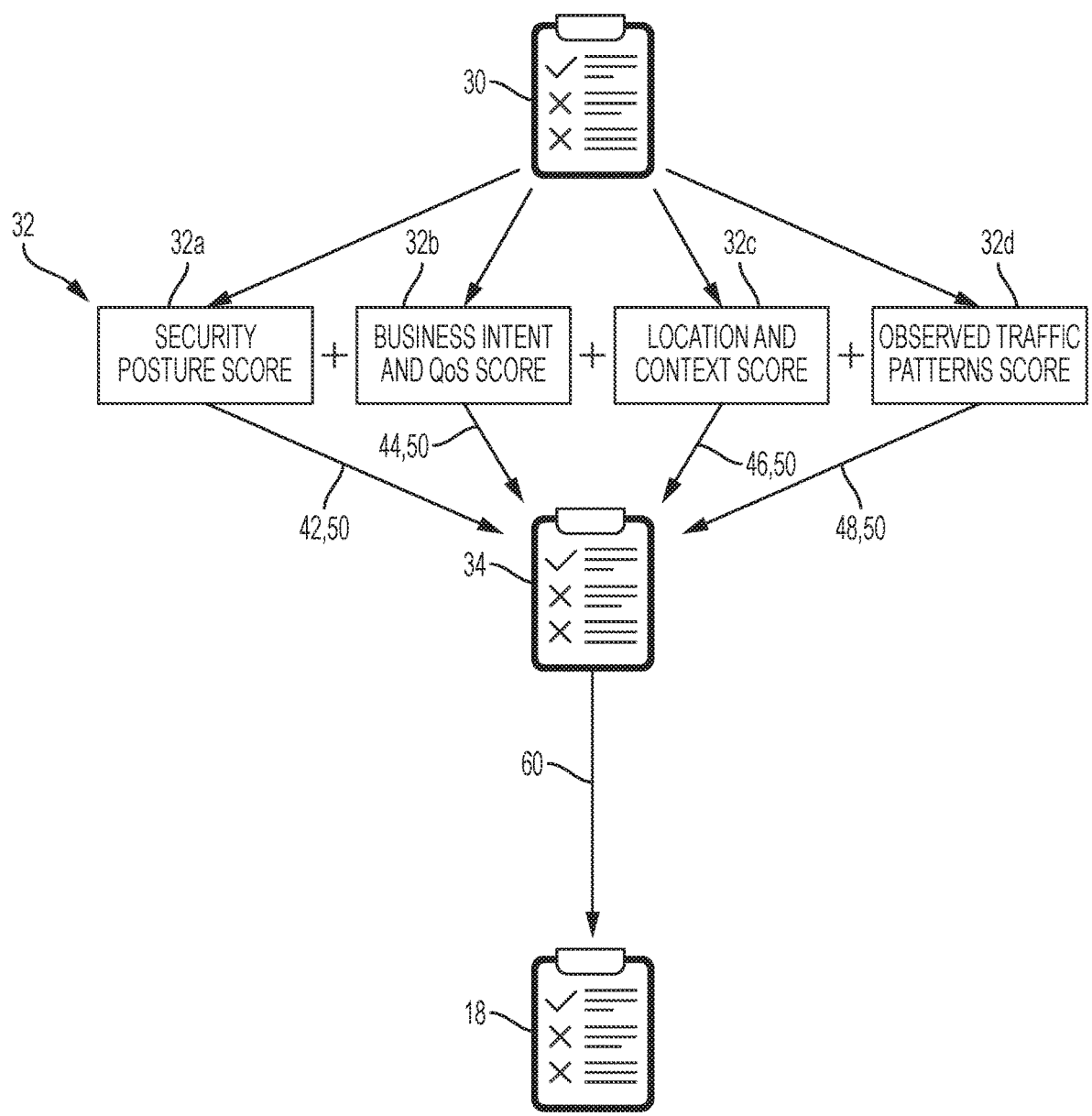
FIG. 3 illustrates an example identification, by the orchestration device of FIG. 1 for a corresponding constrained network device, of a prioritized rule set and a lifetimed rule set from the prioritized rule set, according to an example embodiment.

FIG. 3 illustrates an example identification and generation, by the orchestration device of FIG. 1 for a corresponding constrained network device, of a prioritized rule set and a lifetimed rule set from the prioritized rule set, according to an example embodiment.

Figure 4:
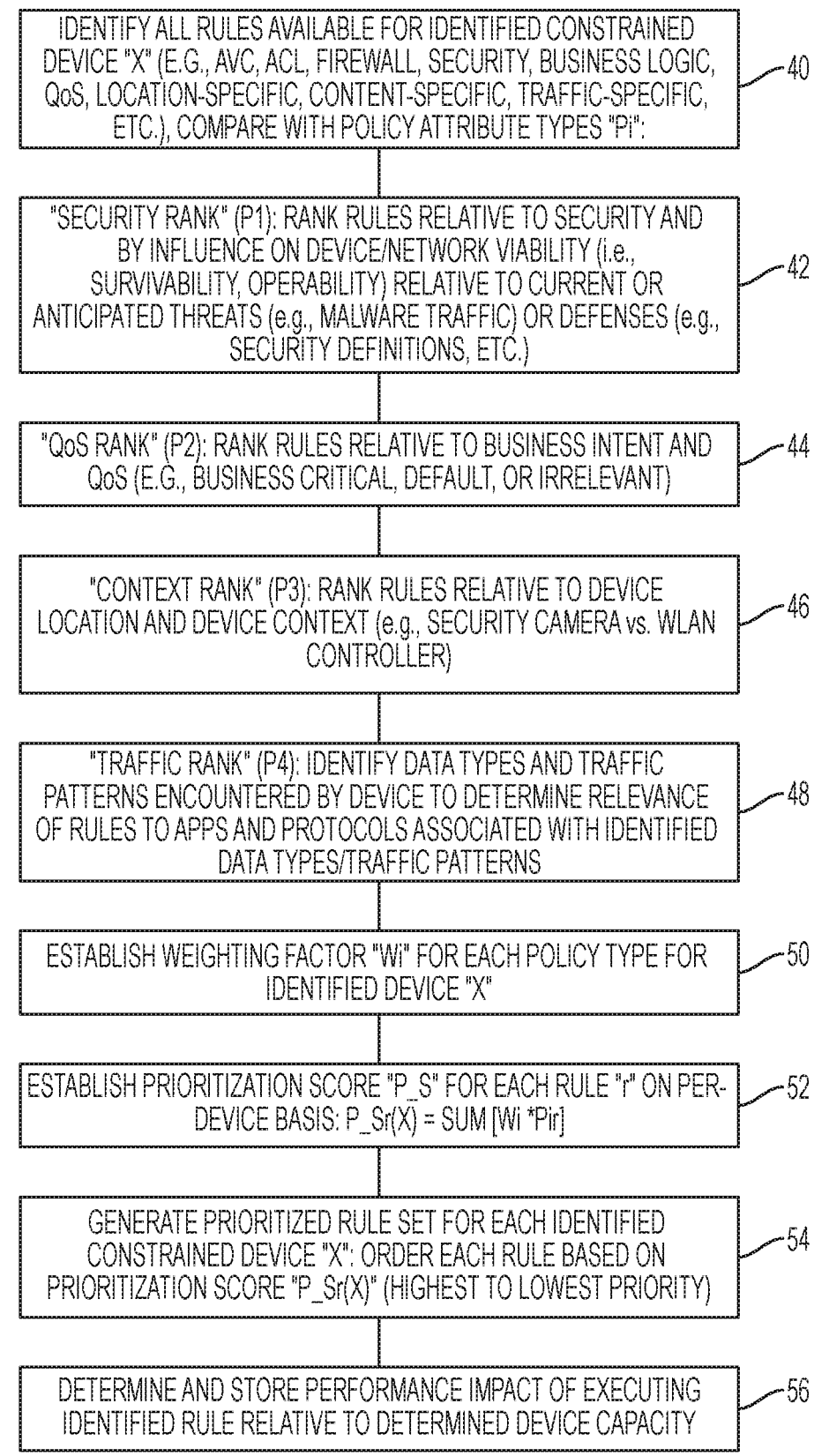
FIG. 4 illustrates an example method, by the orchestration device of FIG. 1 for a corresponding constrained network device, of identifying a prioritized rule set according to an example embodiment.

FIG. 4 illustrates an example method, by the orchestration device of FIG. 1 for a corresponding constrained network device, of identifying and generating a prioritized rule set according to an example embodiment.

Figure 5:
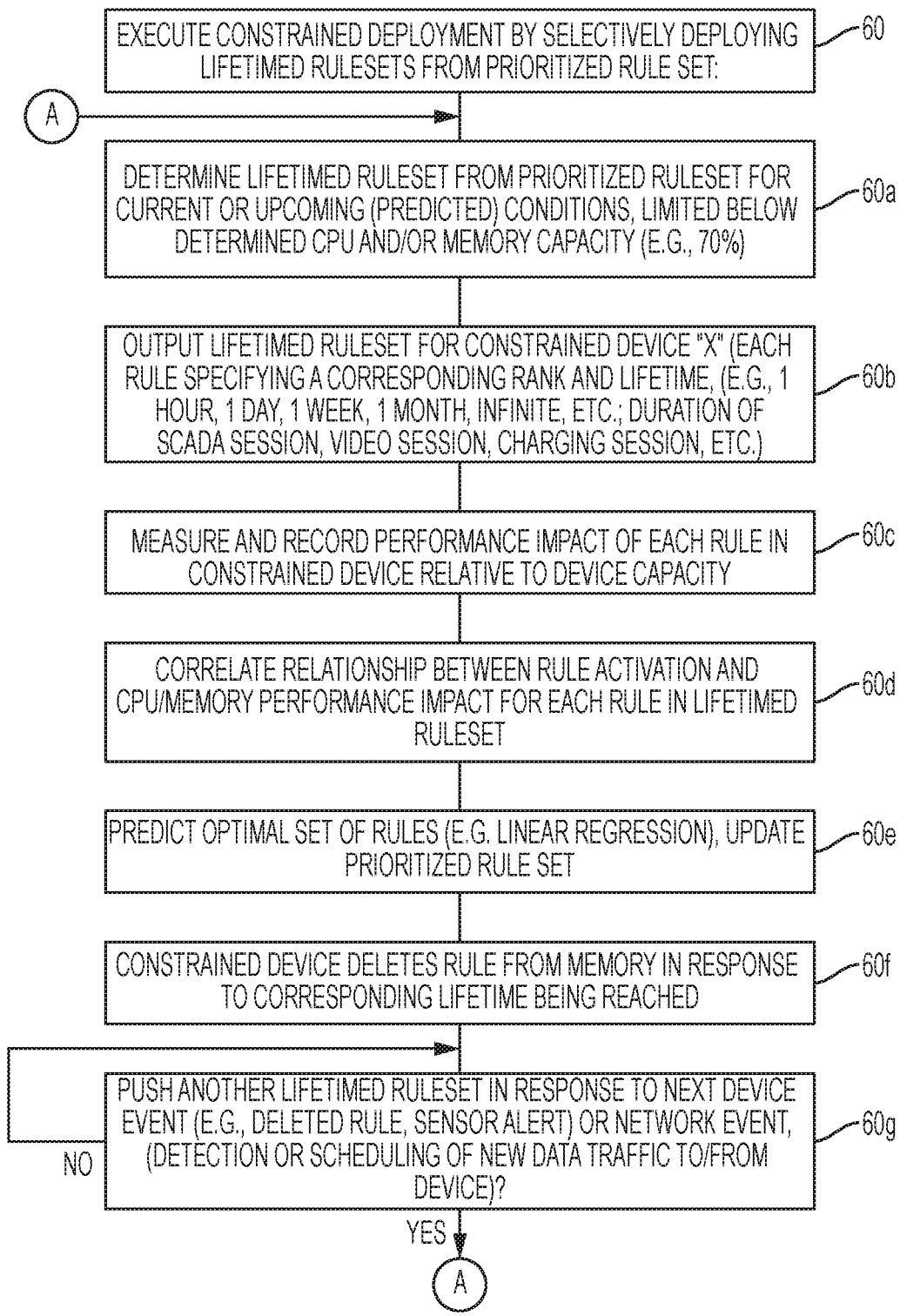
FIG. 5 illustrates an example method, by the orchestration device of FIG. 1 for a corresponding constrained network device, of executing on-demand constrained deployment of the prioritized rule set based on identifying and supplying to the corresponding constrained network device a lifetimed rule set from the prioritized rule set, according to an example embodiment.

FIG. 5 illustrates an example method, by the orchestration device of FIG. 1 for a corresponding constrained network device, of executing on-demand constrained deployment of the prioritized rule set based on identifying and supplying to the corresponding constrained network device a lifetimed rule set from the prioritized rule set, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

As briefly described previously, constrained devices 14 (endpoints, gateways, and other IoT networking devices) need to support a strong array of security and traffic control functions for heterogeneous traffic patterns. However, since these constrained devices 14 have limited CPU, memory, and/or networking resources, it is often impossible and unrealistic to deploy complex traffic rules (e.g. firewall or AVC) because the wide variety of such complex rules exceeds the device capacity of the constrained devices. For example, IoT routers and IoT gateways may typically be configured to relay traffic from different device types (street cameras, weather sensors, parking sensors, etc.), however, such IoT routers and IoT gateways have limited resources that prevent them from supporting large sets of inspection rules to monitor and control traffic; in fact, as little as fifteen (15) to twenty (20) rules may exceed the available capacity of the IoT routers or IoT gateways.

In another example, deployment of a wireless local area network (WLAN) (e.g., in a campus-wide deployment), wireless controllers may be limited to support no more than a maximum of thirty-two (32) Application, Visibility and Control (AVC) rules (e.g., NBAR2 rules) and sixty-four (64) Access Control List (ACL) rules per WLAN due to CPU limitations, regardless of the number of network client devices or Access Point (AP) devices that are present in the constrained data network 16.

Conventional deployments of rulesets have typically utilized an arbitrary ruleset size set manually by a network administrator. Further, manual deployment of rulesets by an administrator often can result in a failure to deploy numerous important security and/or control rules; further, even if such security and/or control rules were included in the rulesets, the effects of changing network devices, security changes, traffic changes, etc., may render the manually-deployed rulesets as sub-optimal or irrelevant in view of the changes in the network conditions, changes in the type of deployed network devices, changes in status in the existing network devices, changes in traffic patterns, changes in security posture, and/or changes in service requirements (e.g., QoS) associated with the management and operations of the constrained data network 16 and/or the data network 10. Hence, the ineffective deployment of rulesets can adversely affect potentially tens of thousands of IoT wireless client devices.

According to example embodiments, the management device 12 can create optimized rule sets (e.g. AVC, ACLs, etc.) for each of the constrained network devices 14 in a manner that promotes maximum rule scaling on a per-device basis, without negatively impacting the processing capacity of the corresponding constrained network device 14. As described below, the management device 12 can utilize a combination of classification, behavioral learning, and individual device rule optimization to ensure that each constrained network device 14 is provided an optimized rule set within its corresponding processing capacity.

As illustrated in FIG. 3, the management device 12 can identify all available rules (i.e., "raw ruleset") 30 for each constrained network device 14, where the raw ruleset 30 includes all available rules that can be executed by the corresponding constrained network device 14. Referring to FIG. 4, the processor circuit 24 of the management device 12 in operation 40 can identify all available rules 30 for each identified constrained device "X" 14: example rules within the raw ruleset 30 can include AVC rules, ACL rules, firewall rules, security rules business logic rules, QoS rules, location-specific rules, content-specific rules, traffic rules, etc.

For example, each constrained network device 14a, 14b, 14c, 14d, 14e, and 14f may have its own corresponding raw ruleset 30 based on a combination of device-specific executable rules and/or generic policies or rules that can be executed by multiple device types, described in further detail below. As one example, the raw ruleset 30 can include generic rules and device-specific rules that are configured for execution according to an operating system deployed in the corresponding constrained network device 14; hence, an Android-based constrained network device 14 could include Android-based rules and possible UNIX based rules in its corresponding raw ruleset 30, however the Android-based constrained network device 14 typically would not include rules intended for Cisco-based devices, Apple iOS-based devices, or Microsoft Windows-based devices, etc. without a specific cross-compatibility function; similarly, a Cisco-based constrained network device 14 would include Cisco-based rules in its corresponding raw ruleset 30, however the Cisco-based constrained network device 14 typically would not include rules intended for Android-based devices, Apple iOS-based devices, or Microsoft Windows-based devices, etc., without a specific cross-compatibility function.

As described below with respect to operations 42 through 48, the processor circuit 24 of the management device 12 compares each of the available rules in the raw ruleset 30 for each constrained network device 14 with different network policy attribute types "Pi" (i=1, 2, . . . for each different policy attribute type) (32 of FIG. 3) to determine the influence (i.e., importance, relevance, etc.), of each of the available rules in the raw ruleset 30 relative to the different policy attribute types 32.

A "network policy attribute type" or "network policy attribute" refers to an identifiable attribute that can affect device performance (e.g., performance of a particular constrained network device 14), network performance (e.g., performance of one or more constrained network devices 14, or other network devices in the constrained data network 16 and/or the data network 10 such as switching devices, router devices, gateway devices, firewall devices, etc.), or application performance (e.g., of an application executed within the constrained data network 16 and/or the data network 10 in a single device or distributed among multiple network devices).

For example, the processor circuit 24 of the management device 12 in operation 42 can determine a security rank for each of the available rules in the raw ruleset 30 relative to a security-based influence 32a for a corresponding constrained network device 14. For example, if the data network 10, the corresponding constrained network device 14 and/or the constrained data network 16 is susceptible to an actual or potential attack (e.g., Denial of Service (DOS) attack or an identifiable "malware") the ranking of rules related to this actual or potential attack can be elevated and allocated a higher numerical priority in real-time. In contrast, rules having less or no relevance toward the security-based influence 32a would be ranked with a low priority. Similarly, if an identified type of data traffic is of particular importance to the corresponding constrained network device 14 or in the constrained data network 16 and/or the data network 10, rules associated with protection of the identified type of data traffic can be ranked in operation 42 as "high priority". Hence, the processor circuit 24 of the management device 12 in operation 42 can rank rules relative to security and by influence on device or network viability (e.g., survivability, operability) relative to current or anticipated threats; hence, a rule defining a defense against an anticipated threat can be allocated a higher security rank.

The processor circuit 24 of the management device 12 in operation 44 can determine a "business intent" and QoS rank for each of the available rules in the raw ruleset 30 relative to a QoS influence 32b for a corresponding constrained network device 14. The QoS influence 32b can be established, for example, by a network administrator in using a policy infrastructure controller, for example the commercially-available Cisco® Application Policy Infrastructure Controller Enterprise Module (APIC-EM). For example, an administrator employing the APIC-EM can categorize applications into various groups, such as business critical, default, or business-irrelevant. Hence, the processor circuit 24 of the management device 12 in operation 44 can rank rules associated with applications with little QoS relevance to the network at a low ranking with respect to the QoS influence 32b, whereas the processor circuit 24 of the management device 12 in operation 44 can rank rules modifying the QoS of core applications at a high ranking with respect to the QoS influence 32b.

The processor circuit 24 of the management device 12 in operation 46 can determine a location and context ranking for each of the available rules in the raw ruleset 30 relative to a network location influence 32c for a corresponding constrained network device 14. The network location influence 32c can be based on the physical location (e.g., based on GPS coordinates or political location (city/state/country)), network location, etc. of the corresponding constrained network device 14. For example, the network location influence 32c can provide a higher ranking for rules that are relevant to regulatory constraints in effect at the location of the corresponding constrained network device 14; other higher rankings can be allocated to rules that are relevant to a network location of the corresponding constrained network device 14 within a network topology (e.g., within a specific sub-Directed Acyclic Graph (sub-DAG)). As another example, a network segment in a controlled environment that comprises only video security cameras would have rules related to camera security and control ranked as highest priority, with low rule flexibility (described below); in contrast, a network segment connecting multiple device types and also standard users (email, etc.) would need higher rule flexibility.

The processor circuit 24 of the management device 12 in operation 48 can determine a traffic ranking for each of the available rules in the raw ruleset 30 relative to a traffic relevance influence 32d for a corresponding constrained network device 14. In particular, the processor circuit 24 of the management device 12 can rank rules relative to relevant data types and relevant traffic patterns encountered by the corresponding constrained network device 14 with respect to associated applications and protocols. For example, the processor circuit 24 of the management device 12 can utilize Cisco IOS Netflow data and device identification to learn the traffic patterns passing through different areas of the constrained data network 16 and/or the data network 10. Cisco IOS Netflow is commercially available from Cisco Systems, San Jose, Calif. Hence, Cisco IOS Netflow can be used to determine the protocols or applications are likely to appear in different parts of the constrained data network 16 and/or the data network 10, and the relative frequency that such protocols or applications are utilized. For example, Manufacturers Usage Description (MUD) snooping can be used by the management device 12 to identify that a parking sensor is added to the constrained data network 16: observation of the traffic flow from the parking sensor can identify that the traffic sensor (e.g., from an individual sensor or a sensor collector for a parking lot) reports space availability every ten (10) minutes; hence, the management device 12 can dynamically add to the traffic relevance influence 32d the association "{device type, flow pattern [volume, periodicity]}" in combination with the other policies 32 described above.

The processor circuit 24 of the management device 12 in operation 50 can establish a weighting factor "Wi" for each policy type for the corresponding identified constrained network device "X" 14. Hence, the scoring for each policy "Pi" 32 can be weighted according to the corresponding weighting factor "Wi" (e.g., having a value from "1" to "100") that identifies the relative importance or influence of the policy "i" 32 for the corresponding constrained network device 14, resulting in a weighted score for a rule "r" (relative to a policy "Pi") as "Wi*Pir", where "*" represents a multiplication operation.

Hence, the processor circuit 24 of the management device 12 in operation 52 can establish (i.e., generate) a prioritization score "P_S" for each rule "r" on a per-device basis "X" (i.e., "P_Sr(X)"), where the prioritization score "P_Sr(X)" represents a weighted sum of the ranks of the corresponding available rule relative to the respective network policy attributes 32, i.e., "P_Sr(X)=SUM [Wi*Pir]".

The processor circuit 24 of the management device 12 in operation 54 can generate the prioritized rule set 34 for the corresponding constrained network device "X" 14 based on ordering each rule "r" in the raw ruleset 30 in the prioritized rule set 34 according to the rule's corresponding prioritization score "P_Sr(X)", for example from highest to lowest priority. Hence, the prioritized rule set 34 provides an ordering of the selected available rules in the raw ruleset 30 relative to the priority of execution by the corresponding constrained network device "X" 14 relative to the corresponding device context, network context, etc. Hence, each constrained network device 14 has its own corresponding prioritized rule set 34 that is generated by the management device 12.

The processor circuit 24 of the management device 12 in operation 56 can perform a "validation" phase of the prioritized rule set 34, where the processing capacity of the corresponding constrained network device 14 can be determined, as part of the device context, based on testing each rule in the prioritized rule set 34 in the corresponding constrained network device 14 (or an equivalent type device that is maintained as a "reference" or a "control" of the actual constrained network device 14 that is deployed in the constrained data network 16), and determining the performance impact (e.g., CPU utilization, memory utilization, and/or interface circuit utilization) of executing a given rule in the constrained network device 14. The performance impact of executing the identified rule (relative to the determined device capacity) can be stored in operation 56 by the management device 12 of the management device 12 in a database (e.g., in the memory circuit 26 of the management device 12 or different storage device reachable by the management device 12). The measurement and storage of a performance impact for each rule in the prioritized rule set 34 can be performed repeatedly over time, enabling the management device 12 to further update and optimize the prioritized rule set 34 for the corresponding constrained network device 14 based on the one or more performance impacts detected for a given rule. As described in further detail below with respect to FIG. 5, the performance impacts encountered by the constrained network device 14 can be aggregated in the database, enabling the management device 12 to execute a prediction of an optimal rule set based on the priorities of execution relative to the performance impacts of the respective rules.

Referring to FIG. 5, the processor circuit 24 of the management device 12 in operation 60 can execute a constrained deployment of the corresponding prioritized rule set 34 based on identifying, from the corresponding prioritized rule set 34, a lifetimed rule set 18 relative to the corresponding device context and network context, and supplying the lifetime rule set to the corresponding constrained network device 14. For example, the processor circuit 24 of the management device 12 in operation 60*a* from the prioritized rule set 34 can determine the lifetimed rule set 18 for current or upcoming (e.g., predicted) conditions (e.g., using the current or predicted conditions as a filter applied to the prioritized rule set 34), determining (as part of the device context) the processing capacity of the constrained network device 14, and limiting the prioritized rule set 34 to below the processing capacity of the corresponding constrained network device 14; hence, the processor circuit 24 of the management device 12 in operation 60*a* can limit the total number of rules in the lifetimed rule set 18 to be less than, for example seventy percent (70%) of the total processing capacity of the management device 12, such that the lifetimed rule set 18 includes only the most influential (i.e., highest-prioritized) rules from the prioritized rule set 34 that are relevant (based on filtering to current and/or predicted conditions), limited to below the processing capacity (e.g., 70%) of the corresponding constrained network device 14.

The processor circuit 24 of the management device 12 in operation 60*b* also can add to each rule in the lifetimed rule set 18, in addition to the corresponding rank of the rule (from the corresponding rank in the prioritized rule set 34), a corresponding lifetime rule that is based on a prescribed timeout interval and/or prescribed completion of a network event, application event, etc. The lifetime rule specifies to a constrained network device 14 that the corresponding rule is to be deleted from the constrained network device 14 to free up system resources after the corresponding rule is no longer needed. For example, the lifetime rule may specify a prescribed lifetime duration, for example one hour, one week, one month (or infinite if the rule is deemed critical and mandatory); alternately, the lifetime rule may be based on its relevance in execution by the corresponding constrained network device 14, such that a Supervisory Control and Data Acquisition (SCADA) based rule may be set to expire upon completion of a SCADA session, a video-based rule may be set to expire upon completion of a video session, a battery-charging based rule may be set to expire in response to a battery reaching a full charge indicating completion of a battery charging session, etc. For example SCADA traffic can be determined by the management device 12 to occur at bursts of 20 minute intervals, followed by 10-minute intervals; hence, a SCADA security rule may be applied first, with no aging, while SCADA prioritization rules are pushed to the WLAN controller, applied for the first burst, and only age (get deleted) after the second burst.

Another example of a lifetime rule can involve seasonal features, for example terminating a rule associated with a motion-triggered video (in a motion-triggered video sensor device) in response to determining that a detected number of animals during migration season falls below ninety percent (90%) of the peak detected values, terminating a flooding rule associated with a water level sensor in response to detecting that a water level of a body of water falls below a mean lower low water (MLLW) value, etc.

The processor circuit 24 of the management device 12 in operation 60*b* can cause the device interface circuit 22 to output the lifetimed rule set 18, comprising for each rule a corresponding rank and a corresponding lifetime rule, to the corresponding constrained network device 14 via the corresponding communication path 20, for the constrained deployment of the lifetimed rule set 18 in the corresponding constrained network device 14. The processor circuit 24 of the management device 12 in operation 60*c* can measure and record the performance impact rule of each rule in the lifetimed rule set 18, relative to the device capacity in the corresponding constrained network device 14. The management device 12 in operation 60*c* can measure and record the performance impact based on sending one or more queries to the associated constrained network device 14 (e.g., a "pull" query), and/or the constrained network device 14 can be configured to "push" performance data to the management device 12, via the corresponding communication path 20, in response to execution of a corresponding rule.

The management device 12 in operation 60*d* can aggregate the performance impacts encountered by the constrained network device 14 for each rule in the lifetimed rule set 18 as the rule is executed by the constrained network device 14. Hence, the processor circuit 24 of the management device 12 in operation 60*d* can correlate the relationship between rule activation and the corresponding performance impact on the corresponding constrained network device 14 for each rule in the supplied lifetimed rule set 18. In one embodiment, a linear relationship may be detected between the impact of each rule and the combined impact of an n-rules timed-ruleset. However, the inventors have determined that the relationship on performance impact by a given rule is not always strictly linear, such that two rules having performance impacts of "i" and "j" separately do not necessarily result in a combined performance impact of "i+j" if concurrently executed by a constrained network device 14, to the contrary, the combined performance impact may be greater than "i+j". Hence, the performance impact of executing multiple rules concurrently can be measured, enabling the processor circuit 24 of the management device 12 in operation 60d and 60e to determine the performance impact of each rule in different execution contexts (e.g., concurrent execution with different rules in the lifetimed rule set 18).

The aggregation of the performance impacts in operation 60d enables the processor circuit 24 of the management device 12 in operation 60e to predict an optimal set of rules based on the priorities of execution relative to the performance impacts, respectively. For example the processor circuit 24 of the management device 12 can execute linear regression to identify the optimal set of rules, to achieve maximum scaling for each device type and context. Other techniques can be used by the management device 12 to identify the optimal set of rules for a lifetimed rule set 18, for example behavioral analytics, etc.

As described previously, the processor circuit 24 of the management device 12 in operation 60f can determine that the constrained network device 14 has deleted from its processor circuit 24 and memory circuit 26 an expired rule, for example based on tracking the associated lifetimed rule (e.g., detecting expiration of a timer maintained by the management device 12), detecting a network event indicating a relevant data flow or application session associated with the lifetime rule is ended, and/or in response to detecting a device event in the form of a message from the constrained network device 14 specifying that one or more of the rules in the lifetimed rule set 18 has been deleted in response to the associated lifetimes having been reached. The processor circuit 24 of the management device 12 also can detect an alarm message from the constrained network device 14, for example a sensor alert from the corresponding constrained network device 14.

In response to detecting in operation 60f the device event or network event indicating expiration of a rule that was executed by the constrained network device 14 (or a sensor alert identifying a new event encountered by the constrained network device 14), the processor circuit 24 of the management device 12 in operation 60g and 60a can generate and send a second lifetimed rule set 18 (comprising selected rules from the corresponding prioritized rule set 34) in response to detecting the deletion of one or more of the rules previously sent to the constrained network device 14 in the initial lifetimed rule set 18. As apparent from the foregoing, the second lifetimed rule set 18 are limited to ensure that the existing rules maintained by the corresponding constrained network device 14 is less than the corresponding processing capacity of the constrained network device 14. The processor circuit 24 of the management device 12 also can add to one or more rules in the second lifetimed rule set 18 an "override" command that can instruct the constrained network device 14 to overwrite an existing rule stored in the constrained network device 14 with the "overriding" rule associated with the "override" command, for example in response to a sensor alert from the constrained network device 14. The processor circuit 24 of the management device 12 can continue to dynamically remove and add rules to the prioritized rule set 34 and/or each successive lifetimed rule set 18, as needed, based on continued monitoring of device events and associated network devices, including performance impacts encountered by the constrained network device 14 in response to various network events.

According to example embodiments, a classification, scoring and behavioral analytics scheme can be executed to create an ordered priority list of rules for constrained network devices such as IoT devices, based on type, location context, business intent, and security posture. The example embodiments can continually execute monitoring of network events and device-specific events to identify the most influential rules relevant to the detected events, and the example embodiments can ensure a scalable and constrained deployment of the most influential rules in a manner that ensures the deployment does not exceed the processing capacity of a constrained network device. Network events such as traffic patterns can be monitored to identify individual device burst cycles. A timed-ruleset ensures that supplied rules can be removed when no longer needed, freeing up device resources to receive new rules.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
a management device, in a constrained network comprising constrained network devices, identifying for each constrained network device all available rules for execution by the corresponding constrained network device, the all available rules a corresponding ruleset of all available rules that can be executed by the corresponding constrained network device;
the management device generating, from the corresponding ruleset of all available rules, a prioritized rule set for each constrained network device, each prioritized rule set having selected available rules ordered relative to priority of execution by the corresponding constrained network device relative to a corresponding device context and a corresponding network context of the corresponding constrained network device; and
the management device executing, for each constrained network device, a corresponding constrained deployment of the corresponding prioritized rule set based on identifying, from the corresponding prioritized rule set, a lifetimed rule set relative to the corresponding device context and network context, and supplying the lifetimed rule set to the corresponding constrained network device;
wherein:
the constrained deployment includes determining, as part of the device context, a processing capacity of the corresponding constrained network device, and
the constrained deployment including limiting the lifetimed rule set to below the processing capacity of the corresponding constrained network device, the lifetimed rule set providing only the highest-priority rules required by the corresponding constrained network device during an identifiable event.

2. The method of claim 1, wherein the constrained deployment includes specifying, for each rule in the lifetimed rule set, a corresponding rank and a corresponding lifetime rule that is based on one of a prescribed timeout interval or a prescribed completion of a network event or an application event.

3. The method of claim 1, wherein the generating includes:
ranking each of the available rules according to a plurality of network policy attributes, and determining for each of the available rules a prioritization score representing a weighted sum of the ranks of the corresponding available rule relative to the respective network policy attributes;
the network policy attributes including at least one of a security influence, a Quality of Service (QoS) influence, a network location influence, or a traffic relevance influence.

4. The method of claim 1, further comprising:
determining at least one performance impact encountered by a constrained network device executing least an identified one of the rules in the lifetimed rule set; and
updating the corresponding prioritized rule set for the constrained network device based on the corresponding performance impact.

5. The method of claim 4, wherein the updating includes:
aggregating the performance impacts encountered by the constrained network device executing the rules from the prioritized rule set that are supplied to the constrained network device;
predicting, for the constrained network device, an optimal rule set based on the priorities of execution relative to the performance impacts, respectively; and
updating the corresponding prioritized rule set based on the corresponding optimal rule set.

6. The method of claim 1, further comprising:
the management device sending a second limited lifetime rule set in response to detecting at least one of a device event or a network event;
the device event including any one of an expired lifetime following deployment of an identified rule in the lifetimed rule set, or a sensor alert from the corresponding constrained network device.

7. An apparatus comprising:
a device interface circuit configured for communication in a constrained network comprising constrained network devices; and
a processor circuit configured for identifying for each constrained network device all available rules for execution by the corresponding constrained network device, the all available rules a corresponding ruleset of all available rules that can be executed by the corresponding constrained network device;
the processor circuit further configured for generating, from the corresponding set of all available rules, a prioritized rule set for each constrained network device, each prioritized rule set having selected available rules ordered relative to priority of execution by the corresponding constrained network device relative to a corresponding device context and a corresponding network context of the corresponding constrained network device; and
the processor circuit further configured for executing, for each constrained network device, a corresponding constrained deployment of the corresponding prioritized rule set based on identifying, from the corresponding prioritized rule set, a lifetimed rule set relative to the corresponding device context and network context, and causing the device interface circuit to output the lifetimed rule set to the corresponding constrained network device;
wherein:
the processor circuit is configured for determining, as part of the device context, a processing capacity of the corresponding constrained network device, and
the processor circuit configured for limiting the lifetimed rule set to below the processing capacity of the corresponding constrained network device, the lifetime rule set providing only the highest-priority rules required by the corresponding constrained network device during an identifiable event.

8. The method of claim 1, wherein the ruleset of all available rules for a corresponding constrained network device include device-specific executable rules according to an operating system deployed in the corresponding constrained network device, and generic rules executable by multiple types of constrained network devices.

9. The apparatus of claim 7, wherein the processor circuit is configured for specifying, for each rule in the lifetimed rule set, a corresponding rank and a corresponding lifetime rule that is based on one of a prescribed timeout interval or a prescribed completion of a network event or an application event.

10. The apparatus of claim 7, wherein:
the processor circuit is configured for ranking each of the available rules according to a plurality of network policy attributes, and determining for each of the available rules a prioritization score representing a weighted sum of the ranks of the corresponding available rule relative to the respective network policy attributes;
the network policy attributes including at least one of a security influence, a Quality of Service (QoS) influence, a network location influence, or a traffic relevance influence.

11. The apparatus of claim 7, wherein:
the processor circuit is configured for determining at least one performance impact encountered by a constrained network device executing least an identified one of the rules in the lifetimed rule set; and
the processor circuit is configured for updating the corresponding prioritized rule set for the constrained network device based on the corresponding performance impact.

12. The apparatus of claim 11, wherein the processor circuit is configured for:
aggregating the performance impacts encountered by the constrained network device executing the rules from the prioritized rule set that are supplied to the constrained network device;
predicting, for the constrained network device, an optimal rule set based on the priorities of execution relative to the performance impacts, respectively; and
updating the corresponding prioritized rule set based on the corresponding optimal rule set.

13. The apparatus of claim 7, wherein:
the processor circuit is configured for sending a second limited lifetime rule set in response to detecting at least one of a device event or a network event;
the device event including any one of an expired lifetime following deployment of an identified rule in the lifetimed rule set, or a sensor alert from the corresponding constrained network device.

14. The apparatus of claim 7, wherein the ruleset of all available rules for a corresponding constrained network device include device-specific executable rules according to an operating system deployed in the corresponding constrained network device, and generic rules executable by multiple types of constrained network devices.

15. One or more non-transitory tangible media encoded with logic for execution by a machine and when executed by the machine operable for:
the machine, implemented as a management device in a constrained network comprising constrained network devices, identifying for each constrained network device all available rules for execution by the corresponding constrained network device, the all available rules a corresponding ruleset of all available rules that can be executed by the corresponding constrained network device;

the management device generating, from the corresponding set of all available rules, a prioritized rule set for each constrained network device, each prioritized rule set having selected available rules ordered relative to priority of execution by the corresponding constrained network device relative to a corresponding device context and a corresponding network context of the corresponding constrained network device; and the management device executing, for each constrained network device, a corresponding constrained deployment of the corresponding prioritized rule set based on identifying, from the corresponding prioritized rule set, a lifetimed rule set relative to the corresponding device context and network context, and supplying the lifetimed rule set to the corresponding constrained network device;

wherein:

the constrained deployment includes determining, as part of the device context, a processing capacity of the corresponding constrained network device, and the constrained deployment including limiting the lifetimed rule set to below the processing capacity of the corresponding constrained network device, the lifetimed rule set providing only the highest-priority rules required by the corresponding constrained network device during an identifiable event.

16. The one or more non-transitory tangible media of claim 15, wherein the constrained deployment includes specifying, for each rule in the lifetimed rule set, a corresponding rank and a corresponding lifetime rule that is based on one of a prescribed timeout interval or a prescribed completion of a network event or an application event.

17. The one or more non-transitory tangible media of claim 15, wherein the generating includes:

ranking each of the available rules according to a plurality of network policy attributes, and determining for each of the available rules a prioritization score representing a weighted sum of the ranks of the corresponding available rule relative to the respective network policy attributes;

the network policy attributes including at least one of a security influence, a Quality of Service (QoS) influence, a network location influence, or a traffic relevance influence.

18. The one or more non-transitory tangible media of claim 15, further operable for:

determining at least one performance impact encountered by a constrained network device executing least an identified one of the rules in the lifetimed rule set; and updating the corresponding prioritized rule set for the constrained network device based on the corresponding performance impact.

19. The one or more non-transitory tangible media of claim 15, further operable for:

the management device sending a second limited lifetime rule set in response to detecting at least one of a device event or a network event;

the device event including any one of an expired lifetime following deployment of an identified rule in the lifetimed rule set, or a sensor alert from the corresponding constrained network device.

20. The one or more non-transitory tangible media of claim 15, wherein the ruleset of all available rules for a corresponding constrained network device include device-specific executable rules according to an operating system deployed in the corresponding constrained network device, and generic rules executable by multiple types of constrained network devices.

* * * * *